Nov. 7, 1961

T. B. SMITH 3,007,808

CURL RESISTANT FELT BASE FLOORING MATERIAL
AND METHOD OF MAKING

Filed Jan. 21, 1959

INVENTOR
THOMAS B. SMITH

ATTORNEY

United States Patent Office 3,007,808
Patented Nov. 7, 1961

3,007,808
CURL RESISTANT FELT BASE FLOORING MATERIAL AND METHOD OF MAKING
Thomas B. Smith, Warwick Township, Lancaster County, Pa., assignor to Armstrong Cork Company, Lancaster, Pa., a corporation of Pennsylvania
Filed Jan. 21, 1959, Ser. No. 788,031
9 Claims. (Cl. 117—68)

This invention relates generally to felt base flooring material and more particularly to curl resistant felt base flooring material. Still more particularly the invention relates to a felt base flooring material having a polymerized vinyl resin on the face thereof and a special back coating to prevent curl.

Felt base flooring materials having polymerized vinyl resins on the face thereof exhibit a tendency to face curl in certain weather conditions. The term "face curl" means that the flooring material forms a concave surface as the viewer looks at the material on the floor. Essentially, this difficulty is manifest by a raising of the edges of the felt base flooring material in position on the floor. Felt base materials are generally not cemented in place and hence are free to respond to any changes in shape brought about by certain temperature and humidity conditions. It will readily be appreciated that the raising of all edges of felt base flooring material during, say, cool, dry weather is an intolerable situation. Yet wherever polymerized vinyl resins are used on the face of a felt base flooring material, some face curl will occur under weather conditions commonly encountered. Thus face curl has become a significant problem in the vinyl resin-coated felt base flooring industry, and no ready solution has heretofore been found.

It is the primary object of the present invention to supply such a solution. It is another object of the present invention to supply an article and the method of making that article which will completely eliminate the face curl problem on felt base floorings having a top layer containing a polymerized vinyl resin.

These objects are accomplished in a surprisingly straightforward and effective manner. The invention contemplates a curl resistant felt base flooring product having a wearing layer containing a polymerized vinyl resin. This wearing layer is affixed to a felt backing in known manner. The felt backing has a back coating thereon comprising polyvinyl alcohol.

Figure 1:
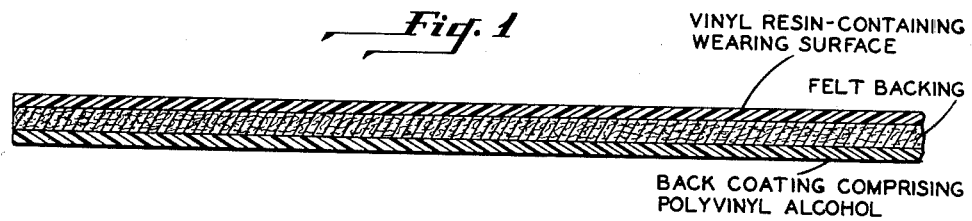
Figure 2:
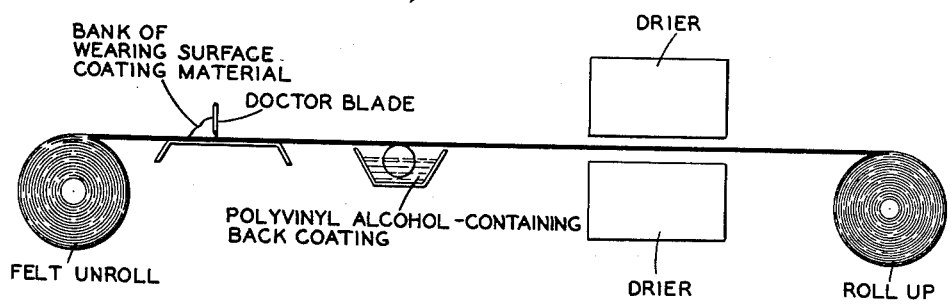

In the drawings, FIG. 1 represents a simplified cross-sectional view of the product of the present invention, and FIG. 2 represents a simplified flow diagram of the process of the present invention. Both figures show self-explanatory legends.

As mentioned above, the particular felt base flooring materials to which the present invention applies are those felt base flooring materials having a top layer of a polymerized vinyl resin. The vinyl resins contemplated are selected from the group consisting of polyvinyl chloride, vinyl chloride-vinyl acetate copolymers, poly lower-alkyl acrylates, poly lower-alkyl methacrylates, and co-polymers of said acrylates and said methacrylates. These polymerized vinyl resins are used in various ways to form the top layer of a felt base flooring. Several layers may be present. For example, one layer may be a pigmented layer having a polymerized vinyl resin as the binder thereof, and this layer may be covered with a clear layer of a polymerized vinyl resin. Another system might involve a seal coat, a printed coat, and a final clear coat. All kinds of patterns and designs are thus possible. There may be used as many layers as desired in order to achieve the necessary effect. For example, after the seal coat, there may be used one or more printed layers, and several clear layers to impart the necessary wear resistance, stain resistance, and color stability to the entire top coating system. Where a series of individual layers is used to form the top coating system, all the layers will contain one or more of the above-described polymerized vinyl resins. The present invention, however, contemplates that only the top or wearing layer of the entire system need contain the polymerized vinyl resin. It is this layer that responds to certain weather conditions by shrinking and producing face curl. Therefore, the present invention is operable wherever, on a felt base flooring, at least one of the layers on the face, and preferably the topmost layer, is of a polymerized vinyl resin of the type customarily used to coat felt base flooring materials.

The backing will be the backing normally used in felt base flooring. Such backings are saturated felts. The felt furnish is normally a rag fiber frequently containing minor amounts of wood fiber. The felt is formed in conventional manner on a Fourdrinier wire or cylinder machine. Subsequent to forming the felt is saturated with a resinous saturant, preferably asphalt. Due to the presence of asphalt in the backing, it is necessary to apply a seal coat, as described earlier, in order to prevent discoloration of the top layers from any bleeding or migration of the asphalt.

It is customary to place a back coat on the felt base product to render the product more attractive prior to use and to impart some protection to the asphalt saturated felt. The present invention is concerned primarily with a careful selection of this back coat in order to eliminate the face curl problem. It has been found unexpectedly that a polyvinyl alcohol back coating will prevent face curl under all reasonable conditions found in use of felt base floor coverings.

The reason for face curl is apparently the shrinkage of the top vinyl resin layer. It is apparent, therefore, that such shrinkage could be cured by application to the back of the asphalt saturated felt of the same coatings which exist on the face. Such a solution is completely impractical and destroys one of the principal values of felt base floor covering, namely, low cost. Low cost cannot be maintained if the same amount of vinyl resin is placed on the back of the asphalt saturated felt as is needed on the face. Use of polyvinyl alcohol on the back, however, unexpectedly solves the entire problem of face curl. The shrinkage of the polyvinyl alcohol is substantially greater than the shrinkage of the vinyl resins used on the face under the same conditions. Hence a very thin film of polyvinyl alcohol on the back will compensate for a very thick film or series of films of other vinyl resins on the face. Furthermore, the thickness of the back film of polyvinyl alcohol can be adjusted to yield the desired compensating factor, with thicker polyvinyl alcohol films exerting greater compensating forces. However, the back film of polyvinyl alcohol never need be very thick and will always be in the range of 0.001–0.003″ in thickness, with the most usual thickness being 0.0015″. Thicknesses of the various components of the finished felt base flooring article will often run about 0.015″ for the entire top layer, including pigmented, clear, and sealing layers, about 0.046″ thickness for the felt, and, as stated above, about 0.0015″ for the back coating of polyvinyl alcohol.

The polyvinyl alcohol to be used may be any of the commercially available polyvinyl alcohols. These materials are prepared by the hydrolysis of polyvinyl acetate wherein the acetate groups are replaced by hydroxyl groups. The degree of hydrolysis generally runs 86–99%, and it has been found that the higher the degree of hydrolysis, the higher the compensating effect when used in the present invention. To state it another way, a film of polyvinyl alcohol having the higher degree of hydrolysis may be used in thinner layers to accomplish the same compensatory effect.

The polyvinyl alcohol back layer may be of pure polyvinyl alcohol. However, for the sake of appearance it is preferred that the backing layer contain pigments along with fillers. Thus pigments such as titanium dioxide may be present in an amount of about 20–70% by weight based on the amount of polyvinyl alcohol. Clays, ground limestone, ground silica, and other inorganic fillers may be used in relatively large amounts, for example, in the range of about 0–1000% by weight based on the amount of polyvinyl alcohol, and more preferably, 50–200% by weight. Since the polyvinyl alcohol is preferably applied in the form of a water solution, it is often desirable to utilize a wetting or dispersing agent in the solution where pigments and fillers are to be used.

The following example illustrates an embodiment of the invention.

Example

An asphalt saturated felt containing 125% by weight asphalt based on the dry weight of the felt was coated with a seal coat having the following formula:

| Ingredients: | Pounds |
|---|---|
| Ethyl acrylate-methyl methacrylate copolymer, preponderance of ethyl acrylate, 46% solids, (Rhoplex AC–33) | 18.36 |
| Tributyl phosphate | 10.2 |
| Pine oil (defoamer) | 7.2 |
| Sodium polyacrylate, disperser (Tamol 731) | 46.0 |
| Titanium dioxide | 550.0 |
| Afton clay | 50.0 |
| Barytes | 50.0 |
| Ground limestone | 1050.0 |

The above ingredients were blended by adding to a mixer the acrylate copolymer, the tributyl phosphate, the pine oil, the dispersant, and the titanium dioxide. The mixture was mixed for two minutes and there was then added the limestone, the barytes, and the clay. After five more minutes of mixing, the suspension was screened through a 60 mesh screen, American Standard, and utilized as the coating paint. The coated felt was dried by treatment in a stove at a temperature of 180° F. for a period of four hours. The dried, coated felt was then passed through a rotogravure press, and a floral design was imprinted thereon.

Subsequently, the printed, coated felt was coated with a clear coat having the following formulation:

| Ingredients: | Pounds |
|---|---|
| Polyvinyl chloride, stir-in type plastisol resin (Exon 654) | 100 |
| Dioctyl phthalate | 30 |
| Stabilizer, barium-cadmium soap | 2 |
| Stabilizer, Advastab CH49 | 1 |
| Mineral spirits, aliphatic, boiling point range 320°–380° F | 15 |

The above organosol was doctored onto the printed felt base coating to form a film 0.005" thick thereon, after which the coating was fused by subjecting the coating to a temperature of about 350° F. for two minutes.

A backing coat was made having the following formula:

| Ingredients: | Pounds |
|---|---|
| Water | ¹ 232.4 |
| Dispersing agent, alkylated, phenol polyethylene oxide ether (Triton X–100) | 1.0 |
| Ground limestone | 100.0 |
| Afton clay | 100.0 |
| Titanium dioxide | 50.0 |
| Polyvinyl alcohol, 96% hydrolyzed, 10% solution (Elvanol 71–30) | 568.0 |

¹ 28 gal.

The above formula was prepared by adding to a mixer the water, the dispersing agent, the titanium dioxide and mixing for three minutes. The whiting and the clay was added during additional mixing along with the polyvinyl alcohol solution.

The finished back coating was doctored onto the backing of the felt base flooring prepared as described above in this example. The final film measured 0.0015" in thickness.

Strips and squares of the felt base floor covering prepared as described above were laid down on floors in various sections of the country. Over an extended period of time no face curling was noted.

Felt base flooring prepared as described above in this example save for the use of a casein-base paint as a back coating instead of the polyvinyl alcohol back coating exhibited pronounced face curling under cool, dry conditions.

I claim:

1. A curl resistant felt base flooring product having a wearing layer containing a polymerized vinyl resin affixed to a felt backing, said felt backing having a back coating thereon comprising polyvinyl alcohol.

2. A flooring product according to claim 1 wherein said polymerized vinyl resin is selected from the group consisting of polyvinyl chloride, vinyl chloride-vinyl acetate copolymers, poly lower-alkyl acrylates, poly lower-alkyl methacrylates, and copolymers of said acrylates and said methacrylates.

3. A flooring product according to claim 1 wherein said back coating is in the range of 0.001–0.003" thick.

4. A flooring product according to claim 1 wherein said back coating contains up to 1000% by weight mineral inorganic filler based on the weight of said polyvinyl alcohol.

5. The method of making a curl resistant felt base flooring product which comprises face coating an asphalt saturated felt backing material with a wearing layer containing a polymerized vinyl resin, and back coating said face-coated felt with a composition comprising polyvinyl alcohol.

6. The method according to claim 5 wherein said polymerized vinyl resin is selected from the group consisting of polyvinyl chloride, vinyl chloride-vinyl acetate copolymer, poly lower-alkyl acrylates, poly lower-alkyl methacrylates, and copolymers of said acrylates and said methacrylates.

7. The method according to claim 5 wherein said back coating layer is applied in a thickness of about 0.001–0.003".

8. The method according to claim 5 wherein said back coating is about 0.0015" thick.

9. The method according to claim 5 wherein said back coating contains up to 1000% by weight mineral inorganic particulate filler based on the weight of said polyvinyl alcohol.

References Cited in the file of this patent

UNITED STATES PATENTS

| 2,072,943 | Cohoe | Mar. 9, 1937 |
| 2,322,367 | Kjellstrand | June 22, 1943 |
| 2,635,537 | Worthen | Apr. 21, 1953 |
| 2,705,683 | Hazeltine et al. | Apr. 5, 1955 |
| 2,766,688 | Halpern et al. | Oct. 16, 1956 |
| 2,852,412 | Hassel | Sept. 16, 1958 |